(12) United States Patent
Guo et al.

(10) Patent No.: US 10,823,647 B2
(45) Date of Patent: Nov. 3, 2020

(54) FULLY-AUTOMATED BIOLOGICAL SLIDE SPECIMEN PROCESSING DEVICE AND PROCESSING METHOD THEREOF

(71) Applicant: XIAMEN TALENT BIOMEDICAL TECHNOLOGY COMPANY, LTD., Fujian (CN)

(72) Inventors: James Guo, Guangdong (CN); Derek Guo, Guangdong (CN)

(73) Assignee: XIAMEN TALENT BIOMEDICAL TECHNOLOGY COMPANY, LTD., Fujian (CN)

( * ) Notice: Subject to any disclaimer, the term of this patent is extended or adjusted under 35 U.S.C. 154(b) by 279 days.

(21) Appl. No.: 16/087,112

(22) PCT Filed: Mar. 21, 2017

(86) PCT No.: PCT/CN2017/077573
§ 371 (c)(1),
(2) Date: Sep. 21, 2018

(87) PCT Pub. No.: WO2017/162151
PCT Pub. Date: Sep. 28, 2017

(65) Prior Publication Data
US 2019/0101477 A1 Apr. 4, 2019

(30) Foreign Application Priority Data

Mar. 21, 2016 (CN) .......................... 2016 1 0160797
Aug. 31, 2016 (CN) .......................... 2016 1 0793736

(51) Int. Cl.
*G01N 1/00* (2006.01)
*G01N 1/31* (2006.01)
(Continued)

(52) U.S. Cl.
CPC ............... *G01N 1/31* (2013.01); *G01N 1/312* (2013.01); *G01N 35/00029* (2013.01);
(Continued)

(58) Field of Classification Search
None
See application file for complete search history.

(56) References Cited

U.S. PATENT DOCUMENTS 3,503,683 A 3/1970 Isreeli et al.

FOREIGN PATENT DOCUMENTS

| CN | 102770746 | 11/2012 |
| CN | 105675369 | 6/2016 |

(Continued)

OTHER PUBLICATIONS

"International Search Report (Form PCT/ISA/210)", dated Jul. 10, 2017, with English translation thereof, pp. 1-4.

*Primary Examiner* — Jyoti Nagpaul
(74) *Attorney, Agent, or Firm* — JCIPRNET

(57) ABSTRACT

A fully-automated biological slide specimen processing device and a method. The device mainly includes a testing assembly, a base platform, a Z-arm, an X-arm, a Y-arm, a dispensing nozzle and scanning devices for identifying a reagent and a specimen. The device in the present invention can automatically realize regular and quantitative dispensing according to testing process requirements and testing steps, automatically control the heating, automatically control liquid filling and liquid discharging, and realize full automation of the testing process. When the slide specimen needs a heat treatment, an insertion slot may be directly filled with liquid and be heated.

17 Claims, 7 Drawing Sheets

(51) Int. Cl.
*G01N 35/00* (2006.01)
*G01N 35/10* (2006.01)
*B01L 9/00* (2006.01)

(52) U.S. Cl.
CPC ............ *G01N 35/1002* (2013.01); *B01L 9/52* (2013.01); *G01N 2001/317* (2013.01); *G01N 2035/00039* (2013.01); *G01N 2035/00138* (2013.01); *G01N 2035/00356* (2013.01); *G01N 2035/00752* (2013.01); *G01N 2035/1039* (2013.01)

(56) References Cited

FOREIGN PATENT DOCUMENTS

| | | |
|---|---|---|
| CN | 106353516 | 1/2017 |
| JP | 2014153283 | 8/2014 |

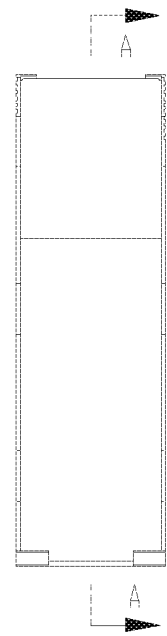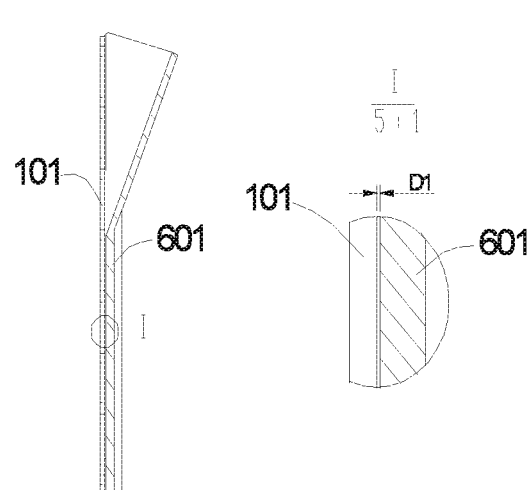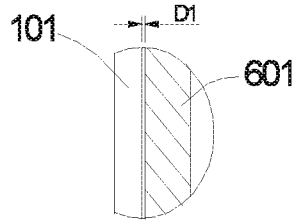
FIG. 8a    FIG. 8b    FIG. 8c
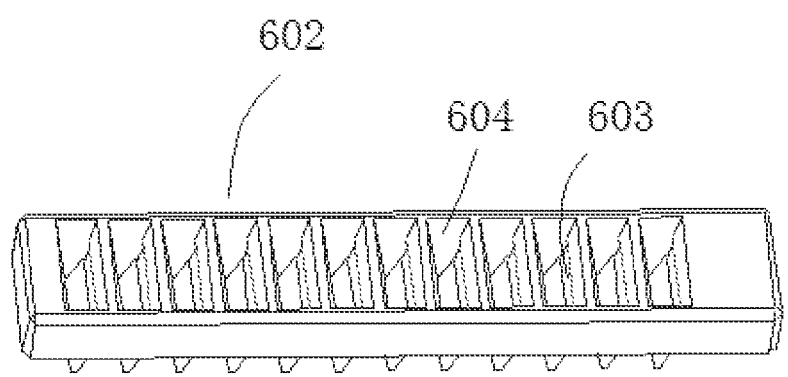
FIG. 9

FULLY-AUTOMATED BIOLOGICAL SLIDE SPECIMEN PROCESSING DEVICE AND PROCESSING METHOD THEREOF

CROSS-REFERENCE TO RELATED APPLICATION

This application is a 371 application of International PCT application Ser. No. PCT/CN2017/077573, filed on Mar. 21, 2017, which claims the priority benefit of Chinese application no. 201610160797.0, filed on Mar. 21, 2016, and Chinese application no. 201610793736.8, filed on Aug. 31, 2016. The entirety of each of the above-mentioned patent applications is hereby incorporated by reference herein and made a part of this specification.

BACKGROUND

Technical Field

The present invention belongs to a field of biological specimen processing, and specifically relates to a fully-automated biological slide specimen processing device and method.

Description of Related Art

The whole process of tests of proteins or genes, such as by immunohistochemistry and by in-situ hybridization gene testing, on a slide specimen requires dozens of complicated steps, and accuracy and reproducibility of the test result thereof may be severely affected by various factors such as environment and manual operation. Enhancing the accuracy, reproducibility and efficiency of specimen testing is of the highest priority.

In current operation of the common instrument, a reagent is dispensed from the above of the slide, and such dispensing position could not guarantee a full cover on the specimen. After adding the reagent, incubation at open may easily lead to problems, such as drainage and evaporation of the reagent and drying of the specimen. A majority of specimens require a heat treatment, which is a necessary step to make a characteristic protein of an antigen or a pathogen restore to an original shape, or make gene strands melt and make tissue hydrated in the gene testing. The heating is generally performed at a temperature of 80-121° C. and maintained for 3 to 60 minutes. However, device that is used for slide specimen processing in the current manual operation is neither heat-resisting, nor has a heating function. During the slide specimen processing, the slide specimen needs to be transferred into a heatable container, and then transferred back to a normal-temperature operation desk, increasing the complexity of the operation process and operation error. The current commonly used automated instruments which have heating function, dispense reagents to the slide specimen and then heat each slide specimen separately by baking, which may easily cause evaporation and drying of the reagent and uneven heating.

Currently, there are almost ten fully-automated immunohistochemistry stainers all over the global market. Particularly, these three instruments, one made by Ventana from US, one made by Leica from Germany and one made by Dako from Denmark, are the most common. However, all these instruments have following drawbacks, including slowness (each run takes 3 to 5 hours), small amount of specimen processing (only 16 to 60 slide specimens at most are processed in each run) and poor reproducibility (differences in the local environment and the controlled temperature due to separate heating of each specimen).

In all these instruments, the slide specimens are laid horizontally which take a rather large space and limit a through-put of the instrument, generally being 16 to 60 pieces.

The reagent is dispensed from the above of the slide, and the dispensing position could not guarantee a position where the specimen locates, causing that the reagent fails to cover the specimen and resulting in false negative.

A majority of specimens require a heat treatment, which is a necessary step to enhance specificity and sensitivity of the slide specimen testing. The heating needs to be carried out at 80° C. or above and maintained for 3 to 60 minutes. The most common methods are cooking in an autoclave, conventional boiling or heating in water bath. However, the heating in the current instruments are carried out in a form of baking, and it is difficult to control the evaporation of reagent and the generation of bubbles. Instrument made by a few manufacturers in the art, such as by Ventana, which uses a method of oil layer covering (i.e. applying a layer of silicon oil after adding a reagent) to reduce evaporation. However, it is difficult to make the silicon oil fully cover on each slide evenly and also a subsequent special cleaning is needed to wash off the silicon oil. The instrument from Leica uses a plastic cover sheet for covering on the reagent to avoid evaporation, but bubbles may accumulate between the specimen and the plastic cover during heating due to a square shape of the slide specimen, leading to problems such as uneven heating, local drying caused by local accumulation of bubbles, and background issue caused by incomplete subsequent cleaning due to local accumulation of bubbles. Other manufacturers, such as Dako, Biocare, Biogenex and the like, perform the processing at a gentler temperature (generally 90 to 97° C.) to prevent problems such as bubbles, evaporation and drying which are caused by boiling. However, such method extends the operation time, while the critical drawbacks like bubbles and evaporation cannot be totally eliminated.

All the instruments employ that each slide specimen is heated separately and controlled at a temperature independently. Temperature differences among the slides and among the instruments are unavoidable, which affect the reproducibility and reliability of specimen processing.

All the instruments perform reagent aspiration and dispensing with a single mechanical arm, which takes a long time to aspirate and dispense reagents, and further limits the through-put of the instruments.

CN102770746A discloses an automated staining device for processing at least one biological specimen on a slide. Said device includes: at least one capillary staining assembly which includes a slide rack support configured to detachably support a slide rack. Said slide rack is configured to support one or more slides and configured to detachably support a capillary cover rack support of a capillary cover rack. Said capillary cover rack is configured to support one or more capillary covers, wherein the slide rack is able to be removed independently of the capillary rack. Said device further includes a first fluid container containing a first fluid, wherein the automated staining device is configured to automatically control the slide rack support to turn one or more slides from an insertion position to one or more inclined positions, and control the capillary cover rack support to allow one or more capillary covers to move toward one or more slides, to automatically form a capillary gap between each slide and each capillary cover, while said capillary gap serves as a capillary cell. When the slide is in said inclined position, a certain amount of the first fluid is automatically supplied to said slide from the fluid container. This patent disclosure has overcome the drawback of a complicated mechanism which processes only one slide once. The cover with a small gap makes a liquid (or a reagent) exist in the small gap of the cover, and as the cover turns by an angle, a small gap exists in the middle of the cover and allows the cover not to attach to (touch) the specimen. However, this patent is unable to process in large quantity. What's more, the slide and the cover need to be turned in this structure, so that operation steps are increased, efficiency is decreased and processing result is affected. The cover is put on the specimen till the specimen is processed to a certain stage, while the cover is movable, when the liquid is required to drained off or discharged and a next reagent enters, the cover needs to be turned over and lifted up, and the cover does not allow the liquid to go through freely. The cover needs to be turned over and lifted up, leading to inconvenient reagent dispensation in the next step. The slide cannot be covered by the cover all the time which is unfavorable to the processing effect.

Thus, a demand for a device and a method for processing a slide specimen more rapidly and more reliable is existing currently.

SUMMARY

In order to solve the above-mentioned problems, the present invention provides an automated device and a method for processing a biological slide specimen, which can process a large quantity of slide specimens more effectively and more reliably.

Objectives of the present invention are achieved at least by one of the following technical solutions.

A fully-automated biological slide specimen processing device, includes a testing assembly, a base platform, a Z-arm, an X-arm, a Y-arm, a dispensing nozzle, a reagent scanner which can identify a barcode and a QR code, and a slide specimen scanner which can identify a barcode and a QR code; and wherein X, Y and Z correspond to coordinate axes of the space rectangular coordinate system.

The testing assembly includes a container, a base, a heating device, a liquid inlet, a liquid outlet, a controller, a thermocouple, a slide, a slide cover plate and a slide rack; the controller controls the heating device to start and to stop, and the heating device is located above the base and below the container; the container is used for containing a heating medium and one or more slide racks; the thermocouple is placed inside the container, and the thermocouple performs a real-time sense on a temperature in the container and transmits a sensed data to the controller, the controller adjusts a heating power output according to the sensed data; and the reagent scanner and the slide specimen scanner are each connected with the controller and transmit the scanned results to the controller.

The slide cover plate fits with the slide to assemble a set of slide assembly for specimen processing; two ends of the slide rack are hung on two lateral sides facing toward each other of the container, so that a gap is provided between a bottom end of the slide assembly in the slide rack and a bottom of the container; the slide rack is provided with a plurality of integrated V-shape insertion slots which are upright or inclined, and a spring piece is fixed inside each V-shape insertion slot; a plurality of V-shape insertion slots are arranged closely in one column, and the slide rack includes one or more columns of V-shape insertion slots; the slide assembly is inserted along the V-shape insertion slot of the slide rack, and a spring pressure generated by that a surface of the slide cover plate presses a plate-type spring is applied on the slide assembly to achieve a clamping function; two ends of the slide rack are hung on two lateral sides facing toward each other of the container, so that the gap is provided between the bottom end of the slide assembly in the slide rack and the bottom of the container.

The Z-a in is upright fixed on the base platform; the X-arm is mounted on the Z-arm, and the Z-arm is provided with a stepper control mechanism thereon for controlling the X-arm to move vertically along the Z-arm; the Y-arm is mounted on the X-arm, and the X-arm is provided with a stepper control mechanism thereon for controlling the Y-arm to move horizontally along the X-arm.

One dispensing nozzle or a plurality of dispensing nozzles are mounted on the Y-arm to form a dispensing nozzle set; the Y-arm is provided with a stepper control mechanism which is able to drive the dispensing nozzle set to move along the Y-arm under the control of the controller; and the Y-arm is further provided with a spacing adjustment mechanism which is able to adjust a spacing between each dispensing nozzle of the dispensing nozzle set under the control of the controller.

Under the control of the stepper control mechanisms, the dispensing nozzle is able to move vertically to adjust an altitude of the dispensing nozzle, that is, a distance from the base platform; and the dispensing nozzle is able to automatically move to the above of a reagent loading reservoir of the slide assembly under the control of the stepper control mechanisms.

Further, the dispensing nozzle is connected to an aspiration micropump via tubes; under the control of the controller, the aspiration micropump is able to control volumes and frequencies of aspirating reagent and releasing reagent in each time, control a reagent dispensing amount of each time, control aspirating the reagent once and releasing all in once and control aspirating the reagent once and releasing to a plurality of specimens in multiple dispensations.

Further, a number of the testing assembly is one or multiple, and a plurality of the testing assemblies are placed in parallel on the base platform, for processing a large amount of slide specimens simultaneously or processing the slide specimens that require different operation procedures.

Further, the stepper control mechanism is a lead-screw mechanism driven by a stepper motor or a belt transmission mechanism driven by a stepper motor.

Further, the processing device further includes a feeding control unit connected with the liquid inlet and a drainage control unit connected with the liquid outlet. The feeding control unit and the drainage control unit are implemented by a micropump or a magnetic valve. The micropump or the magnetic valve is controlled by the controller to achieve quantitative filling and discharging; and the controller is connected with a host and receives a command from the host.

Further, the cover plate includes a capillary plane, a depth locating face, a width locating block, a bottom locating block, a reservoir side face and a reservoir opening face; two depth locating faces are provided above two lateral sides facing toward each other of the capillary plane, and the capillary plane is parallel to the depth locating faces; portions of a plane of the slide which are close to edges of two sides are attached to the depth locating faces, so that a capillary gap is formed between a slide surface and the capillary plane; one or more width locating blocks are provided at an outer edge of each depth locating face which is far away from the capillary plane; a vertical distance between the width locating blocks located on different depth locating faces matches to a width of the slide to play a stopping function; the bottom locating block is provided at a bottom of the depth locating face; the reservoir opening face is connected with an upper end of the capillary plane and forms an angle A1, and A1 is a plane angle of 1° to 175°; two sides of the reservoir opening face are each connected with one reservoir side face; the reservoir opening face and two reservoir side faces and a slide plane together constitute one reagent loading reservoir which is connected with the capillary gap, the bottom of the capillary gap has a gap opening; a length of the slide cover plate corresponds to or is equal to that of the slide, one label dent is provided on each side of the reservoir side face which is attached to the slide plane, that is, upper ends of the two depth locating faces are each provided with one label dent, and when the label is stuck to the slide, the label dent provides enough space for containing a thickness of the label, enabling the slide cover plate to be pressed tight against the slide without being affected by whether the label is stuck to the slide; outer sides of the two reservoir side faces are provided with top stripes for enhancing a friction between the reservoir side face and the finger; a vertical distance between the capillary plane and the depth locating face is 0.01 to 0.5 mm, so that after the slide cover plate is pressed tight against the slide, one capillary gap having a spacing of 0.01 to 0.5 mm is formed between the slide surface and the capillary plane; and a thickness of the width locating block that is higher beyond the depth locating face is 0.1 to 1 mm; the bottom locating block is upward hook-like, and the bottom locating block and the width locating block together determine a relative position after the cover plate is pressed against the slide, and assist keeping the cover plate being pressed tight against the slide.

Further, the slide assembly which is inserted in the V-shape insertion slot is placed upright or inclined. An angle between the slide assembly and the vertical direction is 1° to 90°.

Further, the heater adopts electrical bar heating, electrical wire heating, microwave heating, electromagnetic induction heating or circulating thermo medium heating (hot liquid bath); and the heater and the container form an integral structure or a detachable structure.

Further, an outline of an upper end of the slide assembly assembled by the slide and the cover plate matches with the V-shape insertion slot on the rack, so that the slide assembly can be inserted in the V-shape insertion slot on the slide rack, and a plurality of slide assemblies are arranged closely; the spring piece and the V-shape insertion slot of the slide rack form an integral connected structure, or are in independently separate configuration; when the independently separate configuration is adopted, the spring piece is fixed inside the V-shape insertion slot by means of embedding or adhesion.

A processing method using the fully-automated biological slide specimen processing which is mentioned above, wherein in such method, the reagent scanner and the slide specimen scanner are both connected with the controller, transmit the scanned results to the controller which generates a corresponding command of dispensing reagent; each dispensing nozzle is controlled by the controller independently, but it is able to coordinately aspirate of multiple reagents separately or simultaneously, or to release reagents to a plurality of slide specimens separately or simultaneously; there's at least one biological specimen on the slide; when the biological specimen is in a heat treatment, the slide assembly in the slide rack is immersed or inserted in the heating medium in the container, rather than that the slide specimen is baked after dispensing the reagent on the slide specimen; and specimens on a plurality of slides are immersed in one same container at a temperature controlled by the controller and the heat treatment is carried out uniformly, rather than that each slide specimen is heated separately at temperatures which are controlled independently. Among the slide assembly during the whole process of slide specimen processing, a relative position between the slide cover plate and the slide is fixed still from the beginning till the end without separation.

Further, when the slide assembly is in the heat treatment, the heating medium in the container can be heated to boiling, which boiling point serves as a controlled temperature for the heat treatment, enabling the heat treatment to have uniformity, reliability and reproducibility.

Further, it is assumed that a required temperature maintaining time after a solution in the container starts boiling is $T2$; when the heating starts, the controller sets a heating power as $K1$ to perform a fast heating; during the heating, the thermocouple provides a feedback of a solution temperature at any moment; and when the temperature reaches to the boiling point, the controller sets the heating power as $K2$, keeps the solution boiling gently and activates timing simultaneously, and the heating is stopped when the timing reaches to $T2$.

Further, after testing and verifying the heating for the container, it only requires to set a time $T1$ for heating to boiling and the temperature maintaining time $T2$, without adjusting the time and power for heating through a feedback of the thermocouple.

Further, the controller automatically controls a feeding micropump to fill the container with liquid and a drainage micropump to discharge liquid from the container; when the slide specimen processing needs the heat treatment, the feeding micropump fills the container with liquid in order to heat the slide specimen by cooking; and after the heat treatment, the drainage micropump pumps out the heating liquid, or pumps out wastes which are generated during the slide specimen processing.

Further, when a new reagent is added, the new reagent enters the gap from a reagent loading reservoir, the former reagent existing in the gap flows from the guiding opening at the bottom of the slide assembly and liquid in the gap is thus replaced by the newly added reagent automatically; and it does not require steps of removing and draining the former reagent of the previous step before adding the new reagent.

Further, $N1$ columns of slide assemblies are placed on the base platform with a regular spacing $D1$ between each column; each column of slide rack is provided with $N2$ V-shape insertion slots for inserting $N2$ slide assemblies, a distance between each V-shape insertion slot is $D2$; when the slide assemblies are inserted in a form of $N1$ columns, an array structure for slide assemblies with $N2$ rows and $N1$ columns is formed; it is assumed that the Y-arm is provided with $N3$ dispensing nozzles, while $N2$ is a multiple of $N3$; the controller first according to $D1$ sets a step size for the Y-arm moving along the X-arm, and according to a value of $D2*N3$ sets a step size for the dispensing nozzle set moving along the Y-arm; it is assumed that a volume required by dispensing a reagent is $M$ and the aspiration micropump has a flow velocity of $V1$, and then a dispensing time for a single dispensation is $t1=M/V1$ and is automatically controlled by the controller; when dispensing reagent is needed during testing, the controller controls the dispensing nozzle set to move to the above of the reagent loading reservoir of the slide assembly which needs dispensation, starts the aspiration micropump with the dispensing time of $t1$, and after the dispensation is finished, the controller controls the dispensing nozzle set to move along the X-arm by a distance of D2*N3 to the next dispensing position, until the dispensation for one column of slide assemblies to be tested is finished; then, the Y-arm is controlled to move along the X-arm by a distance of D1 to the next column of assemblies to be tested, and the dispensing nozzle slides along the Y-arm in reverse by a distance of D2*N3*(N2/N3−1), that is, the dispensing nozzle returns to a starting point of the corresponding column of slide assemblies and then continues the dispensation.

Further, it is assumed that the feeding micropump has a flow velocity of V2, the drainage micropump has a flow velocity of V3, and the container has a length of L and a width of W; during one operation process, a solution which is required to be added to the container has a depth of H, and then a value of the depth of the solution which is newly added can be set as H in the controller, and at this moment, the controller automatically calculates an operation time of the feeding micropump as T3=L*W*H/V2; when it requires to drain the solution having the depth of H out of the container, the controller automatically controls an operation time of the drainage micropump as T3+Δt, wherein Δt is a set time margin, with a purpose of guaranteeing the liquid in the container to be drained off.

Compared to the prior art, the present invention possesses following advantages and technical effects:

In the present invention, a micro gap is formed in the slide assembly when a slide cover plate is assembled with a slide, so that a dispensed reagent fills the gap via the effects of gravity and capillary siphoning. A section specimen can be covered by the reagent as long as the section specimen is within a range that the gap covers. Conventional method that drops the reagent on the slide specimen may easily cause uneven covering of the reagent.

No matter in which manner the slide assembly which is assembled by a slide and a slide cover plate of present invention is placed, the reagent in the gap would not be drained off. The slide specimen is guaranteed to be covered by the reagent all the time.

The testing assemblies of the present invention such as slide assemblies, the slide rack and the container are made of a heat-resisting material and provided with a connected heating device or a separate heating device, achieving that during the slide processing, the slide remains in situ for heating from the beginning till the end without transferring the slide in the middle of the processing.

The slide may be immersed or with a bottom thereof partially inserted in a hot solution for an immersed heating, and even if there is evaporation, solution in a gap can still be automatically replenished by sucking liquid from a gap opening at the bottom. However, as for the other instruments, after dropping a reagent on the slide, the slide is baked for heating, which may easily cause problems of evaporation and drying of slide.

In the present invention, a plurality of slide specimens are immersed in one same container for a uniform heating at a temperature controlled by a single-controller, rather than that each slide specimen is heated separately at temperatures which are controlled independently. Reducing differences in the heat treatments among the specimens enhances the reproducibility of slide specimen processing.

The slide specimens of the present invention are closely inserted in the insertion slots in multi-row and multi-column by an upright angle or inclined angle, and forms an array structure which greatly saves space.

In the present invention, a dispensing nozzle set formed by a plurality of dispensing nozzles is mounted on the Y-arm. Low efficiency of aspirating reagent and dispensing reagent via a conventional single dispensing nozzle is overcome.

The dispensing nozzle of the present invention can slide on the Y axis, and a distance between the dispensing nozzles can be adjusted to determine positions for aspirating reagent and dispensing reagent. The dispensing nozzle can also slide vertically on the Y axis to adjust the required altitudes for aspirating reagent and dispensing reagent. Aspirating reagent and dispensing reagent accurately and flexibly are achieved.

The testing assembly of the present invention is provided with devices for automatically filling liquid and discharging liquid via micropumps, realizing an automatic control of rapid filling and discharging during the slide processing.

The fully-automated biological slide specimen processing device and method of the present invention, are characterized in capable of processing the slide specimens in large quantity, rapidly, reliably and fully automatically.

The V-shape insertion slot has a simpler structure with lower cost, and structurally fits with the slide assembly.

The V-shape insertion slot structurally fits with the slide assembly, enabling the container to contain more slide assemblies. When in use, it only requires the fingers to clamp the top stripes portions of two reservoir side faces and the slide, so that it is easy to insert the slide assembly into the insertion slot. Uneven stressing generated when a top end of the slide is pressed and separation of the slide from the slide cover plate owing to deviation of a stressing direction are prevented, guaranteeing the formation and accuracy of the capillary gap and making the operation simpler and faster. Besides, arrangement of the slide assemblies can be tighter, which further saves space and enhances a processing efficiency.

Identification and positioning of kinds of reagents and slide specimens are transmitted to the controller by the identification of the corresponding barcode or QR code on the label via the scanners, to direct a corresponding command of aspirating and dispensing reagent.

BRIEF DESCRIPTION OF THE DRAWINGS

FIG. 8a shows a front view of the slide assembly in FIG. 7.

FIG. 8b shows an A-A section view of FIG. 8a.

FIG. 8c shows an enlarged diagram of part B in FIG. 8b.

FIG. 9 shows a structural diagram of a slide rack in the embodiment.

DESCRIPTION OF THE EMBODIMENTS

The present invention is further described below in combination with specific embodiments, but implementations and protection of the present invention are not limited by these.

Figure 1:
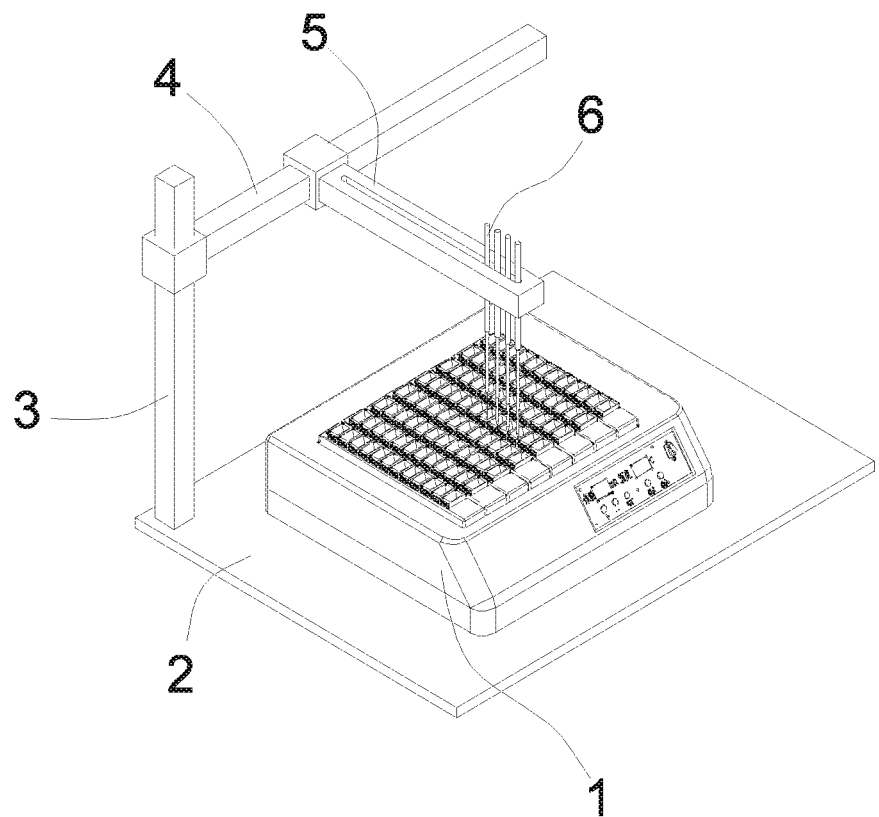
FIG. 1 shows a structural diagram of a fully-automated biological slide specimen processing device of the present invention.
Figure 2:
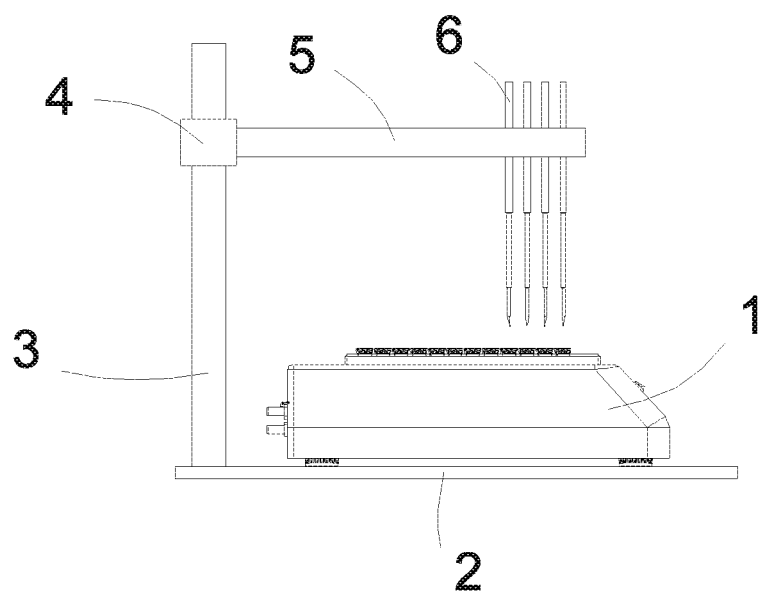
FIG. 2 shows a left side view of FIG. 1.
Figure 3:
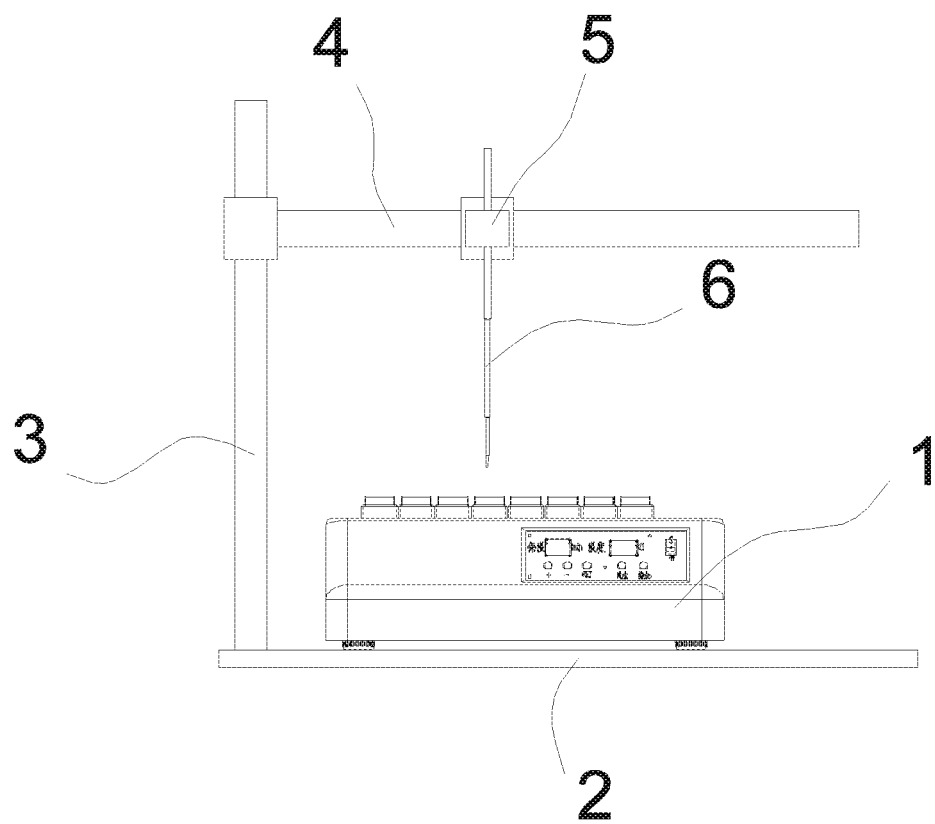
FIG. 3 shows a front view of FIG. 1.
Figure 4A:
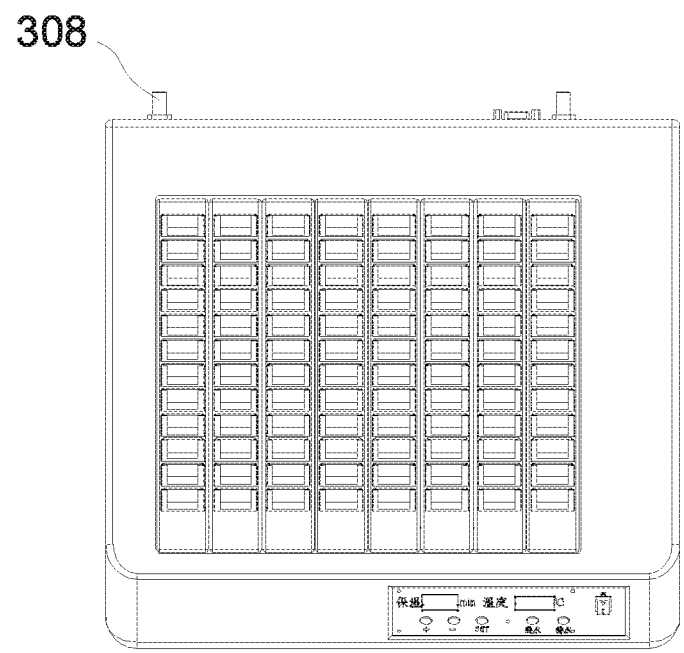
FIG. 4a shows a structural diagram of a testing assembly in the embodiment.
Figure 4B:
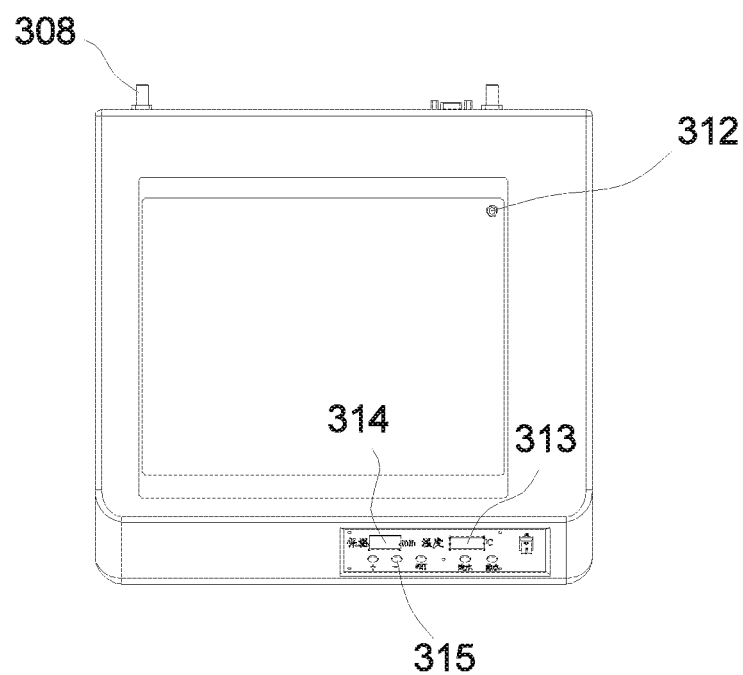
FIG. 4b shows a view of FIG. 4a in which a slide rack is removed.
Figure 5A:
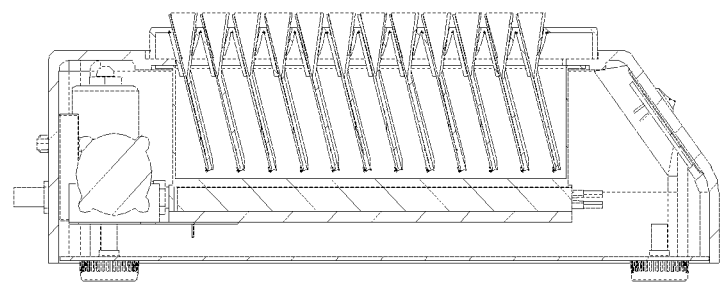
FIG. 5a shows a section view of the testing assembly in the embodiment.
Figure 5B:
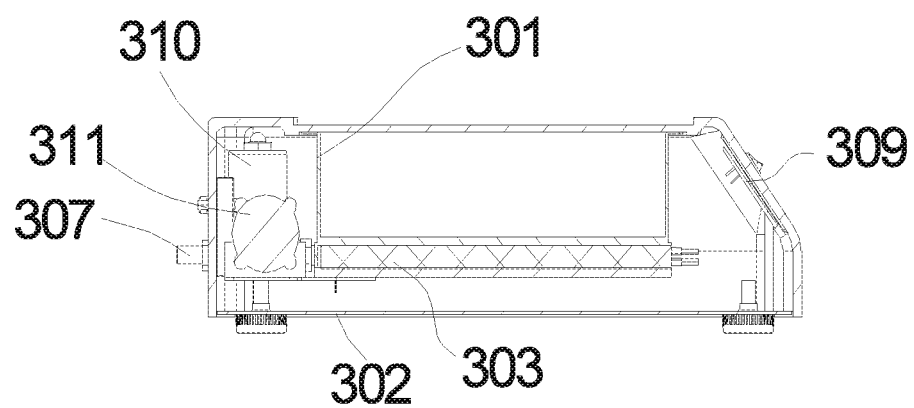
FIG. 5b shows a view of FIG. 5a in which the slide rack is removed.
Figure 6:
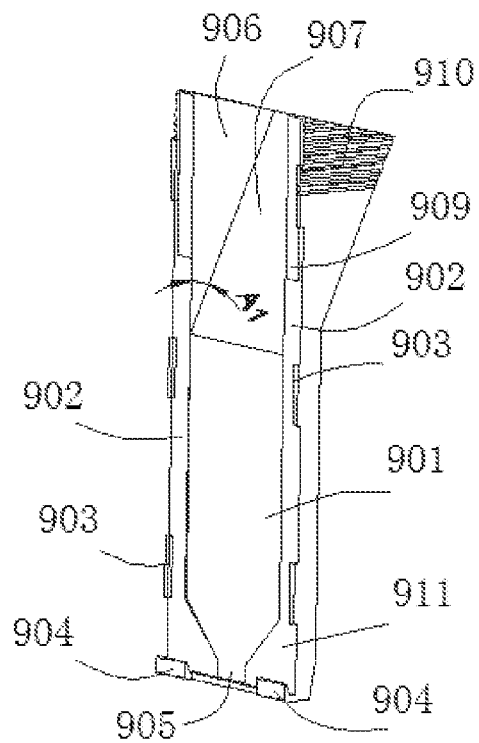
FIG. 6 shows a diagram of a slide cover plate in the embodiment.

As shown in FIG. 1 to FIG. 3, a fully-automated biological slide specimen processing device in the embodiment includes a testing assembly 1, a base platform 2, a Z-arm 3, an X-arm 4, a Y-arm 5, a dispensing nozzle 6, a reagent scanner which can identify a barcode and a QR code, and a slide specimen scanner which can identify a barcode and a QR code; wherein X, Y and Z correspond to coordinate axes of the space rectangular coordinate system.

As shown in FIG. 4a to FIG. 5b, the testing assembly 1 includes a container 301, a base 302, a heating device 303, a liquid inlet 308, a liquid outlet 307, a controller 309, a thermocouple 312, a slide 101, a slide cover plate 601 and a slide rack 602; the controller 309 controls the heating device to start and to stop heating, and the heating device 303 is located above the base 302 and below the container 301; the container 301 is used for containing a heating medium and one or more slide racks 602; the thermocouple 312 is placed inside the container, and the thermocouple 312 performs a real-time sense on a temperature in the container 301 and transmits a sensed data to the controller 309, the controller 309 adjusts a heating power output according to the sensed data. In the embodiment, the liquid outlet 307 is connected with a drainage pump 310 for discharging liquid from the container when necessary; and the liquid inlet 308 is connected with a feeding pump 311 for filling the container with liquid when necessary. In the embodiment, the device further provides a heat treatment time (temperature maintaining time) display module 314 for showing a time duration of the heat treatment and a temperature maintaining time adjustment button 315 for setting a time duration of the temperature maintaining.

The reagent scanner and the slide specimen scanner are each connected with the controller and transmit the scanned results to the controller. The reagent scanner is mounted on the left lower front of the base platform 2, for identifying the kind and position of the reagent. The slide specimen scanner is independently placed on the edge of the base platform 2, and the slide specimen can be moved and scanned manually, for identifying the kind and position of the slide specimen.

Figure 7:
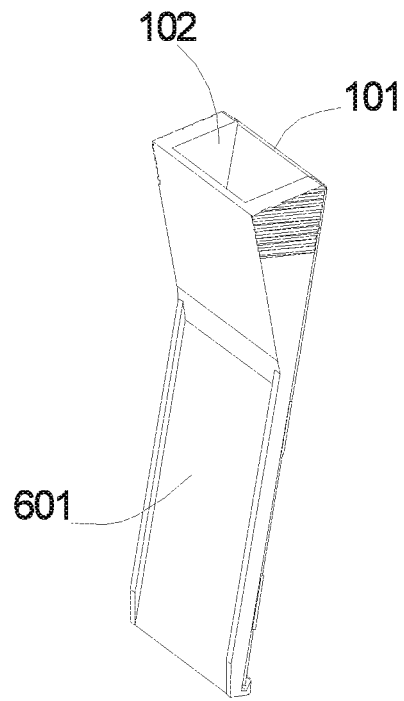
FIG. 7 shows a diagram of a slide assembly which is assembled by the slide cover plate and the slide.
Figure 10:
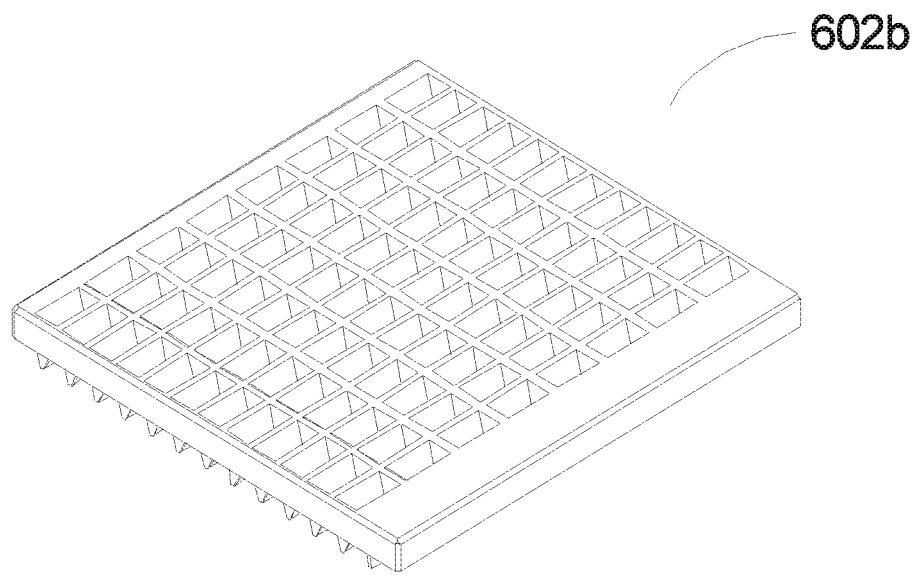
FIG. 10 shows a diagram of the slide rack having multiple columns of insertion slots in the embodiment.
Figure 11:
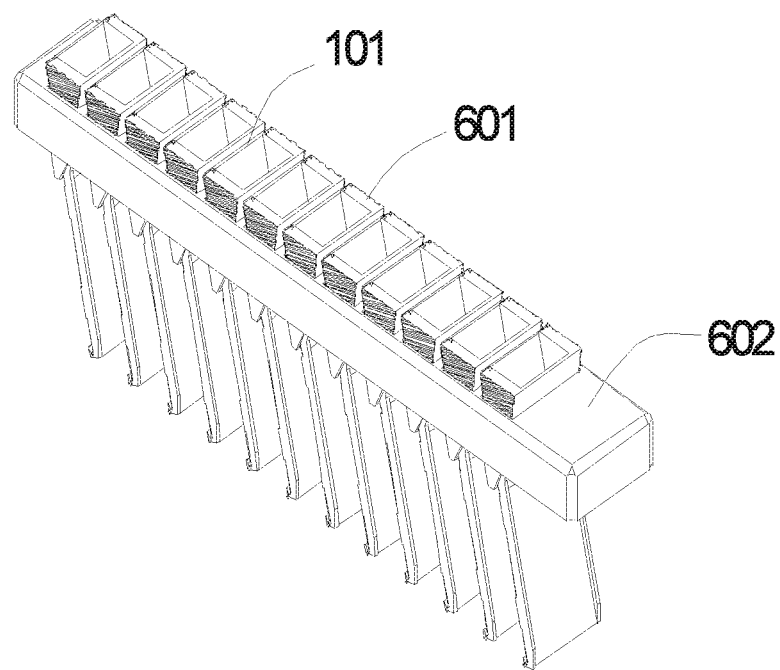
FIG. 11 shows a diagram of a slide rack inserted with a plurality of slide assemblies.

As shown in FIG. 7, the slide cover plate 601 fits with the slide 101 to assemble a set of slide assembly for specimen processing. Two ends of the slide rack 602 are hung on two lateral sides facing toward each other of the container, so that a gap is provided between a bottom end of the slide assembly in the slide rack 602 and a bottom of the container; the slide rack 602 is provided with a plurality of integrated V-shape insertion slots 604 which are upright or inclined, and the spring piece 603 is fixed inside each V-shape insertion slot 604. A plurality of V-shape insertion slots are arranged in one column closely, and the slide rack includes one column of V-shape insertion slots or multiple columns of V-shape insertion slots 602b. The slide assembly is inserted along the V-shape insertion slot 604 of the slide rack. A surface of the slide cover plate 601 presses a plate-type spring 603, and a generated spring pressure is applied on the slide assembly to play a function of clamping. Two ends of the slide rack 602 are hung on two lateral sides facing toward each other of the container, so that a gap is provided between a bottom end of the slide assembly in the slide rack 602 and a bottom of the container. The slide assembly which is inserted in the V-shape insertion slot is placed upright or inclined. An angle between the slide assembly and the vertical direction is 1° to 90°.

The Z-arm 3 is upright fixed on the base platform 2; the X-arm 4 is mounted on the Z-arm 3, and the Z-arm is provided with a stepper control mechanism thereon for controlling the X-arm 4 to move vertically along the Z-arm; the Y-arm 5 is mounted on the X-arm 4, and the X-arm is provided with a stepper control mechanism thereon for controlling the Y-arm 5 to move horizontally along the X-arm.

One dispensing nozzle 6 or a plurality of dispensing nozzles 6 are mounted on the Y-arm 5 to form a dispensing nozzle set; the Y-arm 5 is provided with a stepper control mechanism which is able to drive the dispensing nozzle set to move along the Y-arm under the control of the controller; and the Y-arm is further provided with a spacing adjustment mechanism. As an embodiment, the spacing adjustment mechanism consists of a driving mechanism such as a servo motor, a stepper motor or an air cylinder, incorporating with an operating mechanism such as a lead-screw-nut mechanism or a link mechanism. Under the control of a system controller, the driving mechanism can drive the operating mechanism to operate according to the spacing adjustment requirement, so as to achieve the adjustment of spacing between each dispensing nozzle of the dispensing nozzle set.

Spacing between each dispensing nozzle of the dispensing nozzle can be adjusted under the control of the controller. Under the control of the stepper control mechanism, the dispensing nozzle can move vertically to adjust an altitude of the dispensing nozzle, that is, a distance from the base platform. The dispensing nozzle 6 is able to automatically move to the above of a reagent loading reservoir 102 of the slide assembly under the control of the stepper control mechanisms. The dispensing nozzle 6 is connected to an aspiration micropump via tubes; under the control of the controller, the aspiration micropump is able to control volumes and frequencies of aspiration and releasing reagent in each time, control a reagent dispensing amount of each time, control aspirating the reagent once and releasing all in once and control aspirating the reagent once and releasing to a plurality of specimens in multiple dispensations.

As an embodiment, a number of the testing assembly 1 is one or multiple, and a plurality of the testing assemblies 1 are placed in parallel on the base platform 2 for processing a large amount of slide specimens simultaneously or processing the slide specimens that require different operation procedures. The stepper control mechanism is a lead-screw mechanism driven by a stepper motor or a belt transmission mechanism driven by a stepper motor.

The processing device of the present embodiment further includes a feeding control unit connected with the liquid inlet 308 and a drainage control unit connected with the liquid outlet 307, the feeding control unit and the drainage control unit are implemented by a micropump or a magnetic valve; the micropump or the magnetic valve is controlled by the controller to achieve quantitative filling and discharging; and the controller 309 is connected with a host (for example, a computer) and receives a command from the host.

As shown in FIG. 6, FIG. 7 and FIG. 8a to FIG. 8c, the cover plate includes a capillary plane 901, a depth locating face 902, a width locating block 903, a bottom locating block 904, a reservoir side face 906 and a reservoir opening face 907; two depth locating faces 902 are provided above two lateral sides facing toward each other of the capillary plane 901, and the capillary plane 901 is parallel to the depth locating faces; portions of a plane of the slide which are close to edges of two sides are attached to the depth locating faces 902, so that a capillary gap is formed between a slide surface and the capillary plane 901; one or more width locating blocks 903 are provided at an outer edge of each depth locating face 902 which is far away from the capillary plane 901; a vertical distance between the width locating blocks 903 located on different depth locating faces 902 matches to a width of the slide to play a stopping function; the bottom locating block 904 is provided at a bottom of the depth locating face 902; the reservoir opening face 907 is connected with an upper end of the capillary plane 901 and forms an angle A1, and A1 is a plane angle of 1° to 175°; two sides of the reservoir opening face 907 are each connected with one reservoir side face 906; the reservoir opening face 907 and two reservoir side faces 906 and a slide plane together constitute one reagent loading reservoir which is connected with the capillary gap, the bottom of the capillary gap has a gap opening; a length of the slide cover plate corresponds to or is equal to that of the slide, one label dent 909 is provided on each side of the reservoir side face 906 which is attached to the slide plane, that is, upper ends of the two depth locating faces 902 are each provided with one label dent 909, and when the label is stuck to the slide, the label dent provides enough space for containing a thickness of the label, enabling the slide cover plate to be pressed tight against the slide without being affected by whether the label is stuck to the slide; outer sides of the two reservoir side faces 906 are provided with top stripes 910 for enhancing a friction between the reservoir side face 906 and the finger; a vertical distance between the capillary plane 901 and the depth locating face 902 is 0.01 to 0.5 mm, so that after the slide cover plate is pressed tight against the slide, one capillary gap having a spacing of 0.01 to 0.5 mm is formed between the slide surface and the capillary plane 901; and a thickness of the width locating block 903 that is higher beyond the depth locating face 902 is 0.1 to 1 mm; the bottom locating block 904 is upward hook-like, and the bottom locating block 904 and the width locating block 903 together determine a relative position after the cover plate is pressed against the slide, and assist keeping the cover plate being pressed tight against the slide. A bottom of the capillary plane is further provided with two guiding angles; and one funnel-type guiding opening 905 is formed between the two guiding angles 911, and allows solution in the capillary plane to flow out of the guiding opening.

As an embodiment, the heating device 303 adopts electrical bar heating, electrical wire heating, microwave heating, electromagnetic induction heating or circulating thermo medium heating; and the heater 303 and the container 301 form an integral structure or a detachable structure. As an embodiment, controllers such as PIC MCU, MCU-51 or PLC controller are used. Power-on and power-off of a relay are controlled by the controller, thereby realizing start and stop of the heating function, and realizing control of opening and closing for the inlet and the outlet.

As shown in FIG. 9, an outline of an upper end of the slide assembly assembled by the slide 101 and the cover plate 601 matches with the V-shape insertion slot 604 on the rack, so that the slide assembly can be inserted in the V-shape insertion slot 603 on the slide rack 602, and a plurality of slide assemblies are arranged closely; the spring piece 603 and the V-shape insertion slot 604 of the slide rack form an integral structure, or are independently separate configuration; when the independently separate configuration is adopted, the spring piece is fixed inside the V-shape insertion slot 604 by means of embedding or adhesion.

A processing method for the fully-automated biological slide specimen processing device in the present embodiment, wherein each dispensing nozzle is controlled by the controller independently, but it is able to coordinately aspirate multiple reagents separately or simultaneously, or to release sample to a plurality of slide specimens separately or simultaneously; there's at least one biological specimen on the slide; when the biological specimen is in a heat treatment, the slide assembly in the slide rack is immersed or inserted in the heating medium in the container, rather than that the slide specimen is baked after adding the reagent on the slide specimen; and specimens on a plurality of slides are immersed in one same container at a temperature controlled by the controller and the heat treatment is carried out uniformly, rather than that each slide specimen is heated separately at temperatures which are controlled independently. During the whole process of slide specimen processing, a relative position between the slide cover plate and the slide in the slide assembly is fixed still from the beginning till the end without separation. The controller automatically controls the feeding micropump to fill the container with liquid and the drainage micropump to discharge liquid from the container. When the slide specimen processing needs the heat treatment, the feeding micropump fills the container with liquid in order to heat the slide specimen by cooking; and after the heat treatment, the drainage micropump pumps out the heating liquid, or pumps out wastes which are generated during the slide specimen processing.

When the slide assembly is in the heat treatment, as an embodiment, the heating medium in the container can be simply heated to boiling, which boiling point serves as a controlled temperature for the heat treatment, enabling the heat treatment to have uniformity, reliability and reproducibility.

It is assumed that a required temperature maintaining time after a solution in the container 301 starts boiling is T2; when the heating starts, the controller sets a heating power as K1 to perform a fast heating; during the heating, the thermocouple 312 provides a feedback of a solution temperature at any moment; and when the temperature reaches to the boiling point, the controller sets the heating power as K2, keeps the solution boiling gently and activates timing simultaneously, and the heating is stopped when the timing reaches to T2.

As an embodiment, after testing and verifying the heating for the container, it only requires to set a time T1 for heating to boiling and the temperature maintaining time T2, without adjusting the time and power for heating through a feedback of the thermocouple.

When a new reagent is added, the new reagent enters the gap from a reagent loading reservoir, the former reagent existing in the gap flows from the guiding opening at the bottom of the slide assembly and liquid in the gap is thus replaced by the newly added reagent automatically; and it does not require steps of removing and draining the former reagent of the previous step before adding the new reagent.

As an embodiment, N1 columns of slide assemblies are placed on the base platform with a regular spacing D1 between each column; each column of slide rack is provided with N2 V-shape insertion slots 604 for inserting N2 slide assemblies, a distance between each V-shape insertion slot is D2; when the slide assemblies are inserted in a form of N1 columns, an array structure for slide assemblies with N2 rows and N1 columns is formed; it is assumed that the Y-arm 5 is provided with N3 dispensing nozzles 6, while N2 is a multiple of N3; the controller first according to D1 sets a step size for the Y-arm 5 moving along the X-arm 4, and according to a value of D2*N3 sets a step size for the dispensing nozzle set moving along the Y-arm 5; it is assumed that a volume required by dispensing a reagent is M and the aspiration micropump has a flow velocity of V1, and then a dispensing time for a single dispensation is t1=M/V1 and is automatically controlled by the controller; when dispensing reagent is needed during testing, the controller controls the dispensing nozzle set to move to the above of the reagent loading reservoir of the slide assembly which needs dispensation, starts the aspiration micropump with the dispensing time of t1, and after the dispensation is finished, the controller controls the dispensing nozzle set to move along the X-arm by a distance of D2*N3 to the next dispensing position, until the dispensation for one column of slide assemblies to be tested is finished; then, the Y-arm is controlled to move along the X-arm by a distance of D1 to the next column of assemblies to be tested, and the dispensing nozzle slides along the Y-arm in reverse by a distance of D2*N3*(N2/N3−1), that is, the dispensing nozzle returns to a starting point of the corresponding column of slide assemblies and then continues the dispensation.

It is assumed that the feeding micropump has a flow velocity of V2, the drainage micropump has a flow velocity of V3, and the container has a length of L and a width of W; during one operation process, a solution which is required to be added to the container has a depth of H, and then a value of the depth of the solution which is newly added can be set as H in the controller, and at this moment, the controller automatically calculates an operation time of the feeding micropump 311 as T3=L*W*H/V2; when it requires to drain the solution having the depth of H out of the container, the controller automatically controls an operation time of the drainage micropump 310 as T3+Δt, wherein Δt is a set time margin, with a purpose of guaranteeing the liquid in the container to be drained off.

According to the disclosure and teaching of the above description, those skilled in the art of the present invention may further modify and alter the above implementations. Therefore, the present invention is not limited by the above disclosure and the described specific implementations, and some alteration and modification of the present invention shall also fall into the scope of protection as claimed by the claims of the present invention.

What is claimed is:

1. A fully-automated biological slide specimen processing device, wherein the device comprising: a testing assembly; a base platform; a Z-arm; an X-arm; a Y-arm; a dispensing nozzle; a reagent scanner which can identify a barcode and a QR code of the reagent; and a slide specimen scanner which can identify a barcode and a QR code of the slide specimen, wherein X, Y and Z correspond to coordinate axes of the space rectangular coordinate system;

wherein the testing assembly comprises a container, a base, a heating device, a liquid inlet, a liquid outlet, a controller, a thermocouple, a slide, a slide cover plate and a slide rack, the controller controls the heating device to start and to stop heating, the heating device is located above the base and below the container, the container is used for containing a heating medium and one or more slide racks, the thermocouple is placed inside the container, the thermocouple performs a real-time sense on a temperature in the container and transmits a sensed data to the controller, the controller adjusts a heating power output according to the sensed data, and the reagent scanner and the slide specimen scanner are each connected with the controller and transmit the scanned results to the controller, wherein the slide cover plate fits with the slide to assemble a set of slide assembly for specimen processing, two ends of the slide rack are hung on two lateral sides facing toward each other of the container, a gap is provided between a bottom end of the slide assembly in the slide rack and a bottom of the container, wherein the slide rack is provided with a plurality of integrated V-shape insertion slots which are upright or inclined, a spring piece is fixed inside each of the plurality of V-shape insertion slots, the plurality of V-shape insertion slots are arranged in one column closely, and the slide rack comprises one or more columns of the plurality of V-shape insertion slots, the slide assembly is inserted along the plurality of V-shape insertion slot of the slide rack, and a spring pressure generated by that a surface of the slide cover plate presses a plate-type spring is applied on the slide assembly to achieve a clamping function, and two ends of the slide rack are hung on two lateral sides facing toward each other of the container, so that the gap is provided between the bottom end of the slide assembly in the slide rack and the bottom of the container, wherein the Z-arm is upright fixed on the base platform, the X-arm is mounted on the Z-arm, the Z-arm is provided with a stepper control mechanism thereon for controlling the X-aim to move vertically along the Z-arm, the Y-arm is mounted on the X-arm, and the X-arm is provided with a stepper control mechanism thereon for controlling the Y-arm to move horizontally along the X-arm, wherein one dispensing nozzle or a plurality of dispensing nozzles are mounted on the Y-arm to form a dispensing nozzle set, the Y-arm is provided with a stepper control mechanism which is able to drive the dispensing nozzle set to move along the Y-arm under the control of the controller, the Y-arm is further provided with a spacing adjustment mechanism which is able to adjust a spacing between each dispensing nozzle of the dispensing nozzle set under the control of the controller, under the control of the stepper control mechanisms, the dispensing nozzle is able to move vertically to adjust an altitude of the dispensing nozzle, that is, a distance from the base platform, and the dispensing nozzle is able to automatically move to the above of a reagent loading reservoir of the slide assembly under the control of the stepper control mechanisms.

2. The fully-automated biological slide specimen processing device according to claim 1, wherein the dispensing nozzle is connected to a feeding micropump via tubes, under the control of the controller, the feeding micropump is able to control volumes and frequencies of aspirating reagent and releasing reagent, control a reagent dispensing amount of each time, control aspirating the reagent once and releasing all in once and control aspirating the reagent once and releasing to a plurality of specimens in multiple dispensations.

3. The fully-automated biological slide specimen processing device according to claim 1, wherein a number of the testing assembly is one or multiple, and a plurality of the testing assemblies are placed in parallel on the base platform.

4. The fully-automated biological slide specimen processing device according to claim 1, wherein the stepper control mechanism is a lead-screw mechanism driven by a stepper motor or a belt transmission mechanism driven by a stepper motor.

5. The fully-automated biological slide specimen processing device according to claim 1, wherein the device further comprises a feeding control unit connected with the liquid inlet and a drainage control unit connected with the liquid outlet, the feeding control unit and the drainage control unit are implemented by a micropump or a magnetic valve, the micropump or the magnetic valve is controlled by the controller to achieve quantitative filling and discharging, and the controller is connected with a host and receives a command from the host.

6. The fully-automated biological slide specimen processing device according to claim 1, wherein the cover plate comprises a capillary plane, a depth locating face, a width locating block, a bottom locating block, a reservoir side face and a reservoir opening face, two depth locating faces are provided above two lateral sides facing toward each other of the capillary plane, the capillary plane is parallel to the depth locating faces, portions of a plane of the slide which are close to edges of two sides are attached to the depth locating faces, and a capillary gap is foimed between a slide surface and the capillary plane, wherein one or more width locating blocks are provided at an outer edge of each depth locating face which is far away from the capillary plane, a vertical distance between the width locating blocks located on different depth locating faces matches to a width of the slide to play a stopping function, the bottom locating block is provided at a bottom of the depth locating face, the reservoir opening face is connected with an upper end of the capillary plane and forms an angle A1, and A1 is a plane angle of 1° to 175°, wherein two sides of the reservoir opening face are each connected with one reservoir side face, the reservoir opening face and two reservoir side faces and a slide plane together constitute one reagent loading reservoir which is connected with the capillary gap, the bottom of the capillary gap has a gap opening, a length of the slide cover plate corresponds to or is equal to that of the slide, one label dent is provided on each side of the reservoir side face which is attached to the slide plane, that is, upper ends of the two depth locating faces are each provided with one label dent, and when the label is stuck to the slide, the label dent provides enough space for containing a thickness of the label, enabling the slide cover plate to be pressed tight against the slide without being affected by whether the label is stuck to the slide, wherein outer sides of the two reservoir side faces are provided with top stripes for enhancing a friction between the reservoir side face and the finger, a vertical distance between the capillary plane and the depth locating face is 0.01 to 0.5 mm, so that after the slide cover plate is pressed tight against the slide, one capillary gap having a spacing of 0.01 to 0.5 mm is formed between the slide surface and the capillary plane, and a thickness of the width locating block that is higher beyond the depth locating face is 0.1 to 1 mm, the bottom locating block is upward hook-like, and the bottom locating block and the width locating block together deteiiiiine a relative position after the cover plate is pressed against the slide, and assist keeping the cover plate being pressed tight against the slide.

7. The fully-automated biological slide specimen processing device according to claim 1, wherein the slide assembly which is inserted in the V-shape insertion slot is placed upright or inclined, and an angle between the slide assembly and the vertical direction is 1° to 90°.

8. The fully-automated biological slide specimen processing device according to claim 1, wherein the heating device adopts electrical bar heating, electrical wire heating, microwave heating, electromagnetic induction heating or circulating thermo medium heating, and the heating device and the container form an integral structure or a detachable structure.

9. The fully-automated biological slide specimen processing device according to claim 1, wherein an outline of an upper end of the slide assembly assembled by the slide and the cover plate matches with the V-shape insertion slot on the slide rack, so that the slide assembly can be inserted in the V-shape insertion slot on the slide rack, and a plurality of slide assemblies are arranged closely, wherein the spring piece and the V-shape insertion slot of the slide rack form an integral connected structure, or are independently separate configuration, when the independent separation is adopted, the spring piece is fixed inside the V-shape insertion slot by means of embedding or adhesion.

10. A processing method for the fully-automated biological slide specimen processing device according claim 1, wherein the reagent scanner and the slide specimen scanner are both connected with the controller, transmitting the scanned results to the controller to generate a corresponding command of aspirating and dispensing reagent, each dispensing nozzle is controlled by the controller independently, but it is able to coordinately aspirate multiple reagents separately or simultaneously, or to release reagents to a plurality of slide specimens separately or simultaneously, wherein there's at least one biological specimen on the slide, when the biological specimen is in a heat treatment, the slide assembly in the slide rack is immersed or inserted in the heating medium in the container, and specimens on a plurality of slides are immersed in one same container at a temperature controlled by the controller and the heat treatment is carried out uniformly.

11. The processing method according to claim 10, wherein when the slide assembly is in the heat treatment, the heating medium in the container can be heated to boiling, which boiling point serves as a controlled temperature for the heat treatment.

12. The processing method according to claim 10, wherein it is assumed that a required temperature maintaining time after a solution in the container starts boiling is T2, when the heating starts, the controller sets a heating power as K1 to perform a fast heating,
during the heating, the thermocouple provides a feedback of a solution temperature at any moment, and
when the temperature reaches to the boiling point, the controller sets the heating power as K2, keeps the solution boiling gently and activates timing simultaneously, and the heating is stopped when the timing reaches to T2.

13. The processing method according to claim 10, wherein after testing and verifying the heating for the container, it only requires to set a time T1 for heating to boiling and the temperature maintaining time T2, without adjusting the time and power for heating through a feedback of the thermocouple.

14. The processing method according to claim 10, wherein the controller automatically controls a feeding micropump to fill the container with liquid and a drainage micropump to discharge liquid from the container, when the slide specimen processing needs the heat treatment, the feeding micropump fills the container with liquid in order to heat the slide specimen by cooking, and after the heat treatment, the drainage micropump pumps out the heating liquid, or pumps out wastes which are generated during the slide specimen processing.

15. The processing method according to claim 10, wherein when a new reagent is added, the new reagent enters the gap from a reagent loading reservoir, the former reagent existing in the gap flows from the guiding opening at the bottom of the slide assembly and liquid in the gap is thus replaced by the newly added reagent automatically; and it does not require steps of removing and draining the former reagent of the previous step before adding the new reagent.

16. The processing method according to claim 10, wherein N1 columns of slide assemblies are placed on the base platform with a regular spacing D1 between each column, each column of slide rack is provided with N2 V-shape insertion slots for inserting N2 slide assemblies, a distance between each V-shape insertion slot is D2, when the slide assemblies are inserted in a form of N1 columns, an array structure for slide assemblies with N2 rows and N1 columns is formed, it is assumed that the Y-arm is provided with N3 dispensing nozzles, while N2 is a multiple of N3, the controller first according to D1 sets a step size for the Y-arm moving along the X-arm, and according to a value of D2*N3 sets a step size for the dispensing nozzle set moving along the Y-arm, it is assumed that a volume required by dispensing a reagent is M and the aspiration micropump has a flow velocity of V1, and then a dispensing time for a single dispensation is t1=M/V1 and is automatically controlled by the controller, when dispensing reagent is needed during testing, the controller controls the dispensing nozzle set to move to the above of the reagent loading reservoir of the slide assembly which needs adding reagents, starts the aspiration micropump with the dispensing time of t1, and after the dispensation is finished, the controller controls the dispensing nozzle set to move along the X-arm by a distance of D2*N3 to the next dispensing position, until the dispensation for one column of slide assemblies to be tested is finished, then, the Y-arm is controlled to move along the X-arm by a distance of D1 to the next column of assemblies to be tested, and the dispensing nozzle slides along the Y-arn in reverse by a distance of D2*N3*(N2/N3−1), that is, the dispensing nozzle returns to a starting point of the corresponding column of slide assemblies and then continues the dispensation.

17. The processing method according to claim 10, characterized in that it is assumed that the feeding micropump has a flow velocity of V2, the drainage micropump has a flow velocity of V3, and the container has a length of L and a width of W, during one operation process, a solution which is required to be added to the container has a depth of H, and then a value of the depth of the solution which is newly added can be set as H in the controller, and at this moment, the controller automatically calculates an operation time of the feeding micropump as T3 =L*W*H/V2, when it requires to drain the solution having the depth of H out of the container, the controller automatically controls an operation time of the drainage micropump as T3+Δt, wherein Δt is a set time margin, with a purpose of guaranteeing the liquid in the container to be drained off.

* * * * *